United States Patent
Olander et al.

(10) Patent No.: US 9,258,946 B2
(45) Date of Patent: Feb. 16, 2016

(54) ROUND BALER ACCUMULATION AREA OF WIDTH GREATER THAN BALE CHAMBER

(71) Applicant: AGCO Corporation, Duluth, GA (US)

(72) Inventors: Brian D. Olander, Buhler, KS (US); Charlie O. James, Newton, KS (US); Cedric J. Blough, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 149 days.

(21) Appl. No.: 14/089,798

(22) Filed: Nov. 26, 2013

(65) Prior Publication Data

US 2014/0144119 A1 May 29, 2014

Related U.S. Application Data

(60) Provisional application No. 61/730,070, filed on Nov. 27, 2012.

(51) Int. Cl.
*A01D 39/00* (2006.01)
*A01D 43/02* (2006.01)
*A01D 75/00* (2006.01)
*A01F 15/07* (2006.01)
*A01F 15/10* (2006.01)

(52) U.S. Cl.
CPC ........... *A01F 15/0705* (2013.01); *A01F 15/106* (2013.01)

(58) Field of Classification Search
CPC ... A01F 15/10; A01F 15/106; A01F 15/0705; A01D 43/006; A01D 39/005; A01D 43/06
USPC .............................................. 56/341; 100/88
See application file for complete search history.

(56) References Cited

U.S. PATENT DOCUMENTS

| | | | | |
|---|---|---|---|---|
| 2,909,989 A * | 10/1959 | Bornzin | ................ | A01F 15/10 100/142 |
| 4,062,172 A * | 12/1977 | Rice | .................... | A01F 15/0705 100/77 |
| 4,580,398 A * | 4/1986 | Bruer | ................. | A01F 15/0705 100/5 |
| 5,255,501 A * | 10/1993 | McWilliams | ........... | A01F 15/07 100/88 |
| 5,848,523 A * | 12/1998 | Engel | .................... | A01F 15/106 100/88 |
| 6,029,434 A * | 2/2000 | Ratzlaff | .................. | A01F 15/07 100/88 |
| 6,032,446 A | 3/2000 | Gola et al. | | |
| 6,263,650 B1 | 7/2001 | Deutsch et al. | | |
| 6,279,304 B1 * | 8/2001 | Anstey | ................. | A01D 89/008 198/676 |
| 6,601,375 B1 * | 8/2003 | Grahl | ................... | A01D 89/006 56/16.6 |
| 6,901,732 B2 | 6/2005 | Bares et al. | | |
| 6,948,300 B1 * | 9/2005 | Bandstra | ............... | A01F 15/106 56/119 |
| 7,818,954 B2 | 10/2010 | Rempe et al. | | |
| 8,156,723 B1 * | 4/2012 | McClure | ............. | A01D 89/002 56/341 |
| 8,240,117 B1 * | 8/2012 | McClure | ............. | A01D 89/008 56/341 |
| 8,291,687 B2 | 10/2012 | Herron et al. | | |
| 8,413,414 B2 | 4/2013 | Herron et al. | | |
| 8,464,509 B2 | 6/2013 | Herron et al. | | |
| 8,544,243 B2 | 10/2013 | Herron et al. | | |
| 2002/0095925 A1* | 7/2002 | Preheim | ................ | A01F 15/106 56/341 |
| 2004/0011016 A1* | 1/2004 | McClure | ............... | A01F 15/106 56/341 |
| 2008/0163600 A1* | 7/2008 | Schrag | ................ | A01D 89/005 56/341 |

(Continued)

*Primary Examiner* — Árpád Fábián-Kovács (57) ABSTRACT

A continuous baling method comprising conveying crop material on a rotating conveyor toward a baler while the baler is traversing a field, the conveyor comprising a conveying surface having an entire crop material-carrying width of a first distance; narrowing the flow of the crop material to transition the crop material flow from the conveyor to the baler; and receiving the narrowed flow at an inlet to a baling chamber of the baler, the inlet comprising a width having a second distance smaller than the first distance.

9 Claims, 6 Drawing Sheets

(56) References Cited

U.S. PATENT DOCUMENTS

| | | | |
|---|---|---|---|
| 2011/0023442 A1* | 2/2011 | Herron | A01F 15/0825 56/341 |
| 2012/0096827 A1* | 4/2012 | Chaney | A01F 15/0833 56/341 |
| 2012/0159918 A1* | 6/2012 | McClure | A01F 15/106 56/341 |
| 2012/0204734 A1* | 8/2012 | Reijersen Van Buuren | A01F 15/0705 100/3 |
| 2012/0304612 A1* | 12/2012 | Roberge | A01F 15/106 56/341 |
| 2013/0036921 A1* | 2/2013 | Horstmann | A01F 15/0705 100/5 |

* cited by examiner

ROUND BALER ACCUMULATION AREA OF WIDTH GREATER THAN BALE CHAMBER

CROSS REFERENCE TO RELATED APPLICATION

This application claims priority to U.S. provisional application entitled, "Round Baler Accumulation Area Of Width Greater Than Bale Chamber," having Ser. No. 61/730,070, filed Nov. 27, 2012, which is entirely incorporated herein by reference.

TECHNICAL FIELD

The present disclosure is generally related to conveyor systems and, more particularly, accumulating systems for continuous balers.

BACKGROUND

A continuously operating, round baler is designed with a front feeding accumulating chamber and a bale formation chamber (also, baling or bale chamber). The baler forms a round bale in the bale formation chamber, and then wraps the round bale and ejects it from the bale formation chamber. While the round baler is undergoing the wrapping and ejecting cycles for the bale from the bale formation chamber, crop material gathers at the accumulator to enable the baler to maintain forward travel (hence the description, continuous round baler). One or more challenges to conventional, continuous round balers may result from the accumulating process, particularly given the differences in crop materials and/or conditions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a continuous baling method comprising conveying crop material on a rotating conveyor toward a baler while the baler is traversing a field, the conveyor comprising a conveying surface having an entire crop material-carrying width of a first distance; narrowing the flow of the crop material to transition the crop material flow from the conveyor to the baler; and receiving the narrowed flow at an inlet to a baling chamber of the baler, the inlet comprising a width having a second distance smaller than the first distance.

DETAILED DESCRIPTION

Certain embodiments of a continuous baling system and associated method are disclosed that comprise an accumulation frame having a width that is wider than a bale chamber of the baler. The wider width of the accumulation frame enables more crop material (e.g., material other than grain (MOG), such as biomass) accumulation in a shorter frame, which may improve baling system maneuverability.

Digressing briefly, when accumulating crop material for a continuous round baler, it is important to be able to accumulate a large volume of crop material. Compared to certain embodiments of the accumulation frame disclosed herein, conventional accumulation frames are either narrower than, or of the same width as, the actual bale chamber (also referred to herein as baling chamber). The chamber-width, accumulation frames, and narrower models, are either relatively tall or long to enable the accumulation of enough crop material to allow for continuous baler operation during the wrapping and ejection cycles of the baler. One or more embodiments address these challenges of conventional systems, among others.

Having summarized certain features of a continuous baling system of the present disclosure, reference will now be made in detail to the description of the disclosure as illustrated in the drawings. While the disclosure will be described in connection with these drawings, there is no intent to limit it to the embodiment or embodiments disclosed herein. For instance, though described in the context of a continuous round baler system, other baler systems and/or configurations may be used in some embodiments, and hence are contemplated to be within the scope of the disclosure. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the baler looking forwardly.

Figure 1:
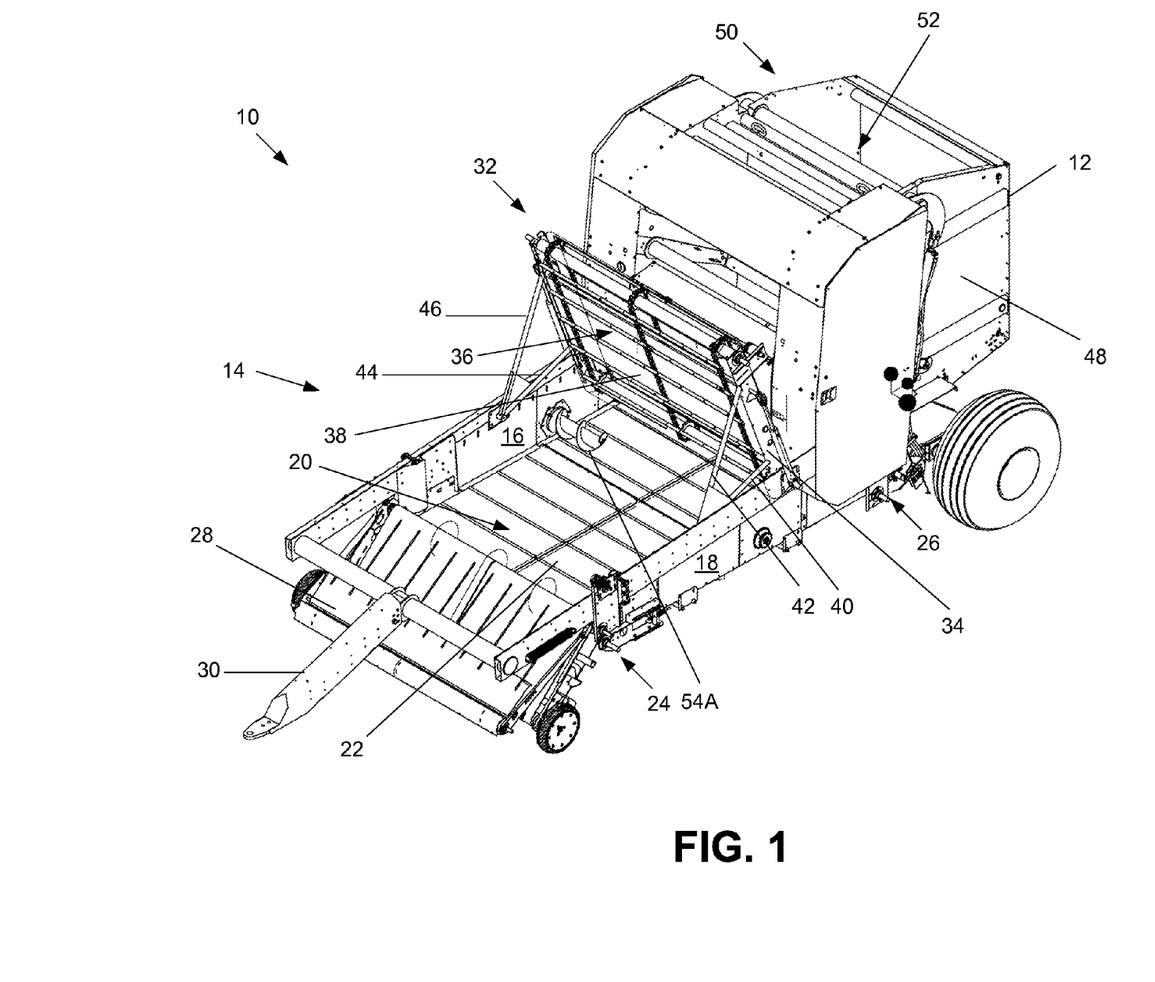
FIG. 1 is a schematic diagram in isometric view that illustrates an embodiment of a continuous baling system containing an embodiment of an accumulation frame.

Reference is made to FIG. 1, which illustrates an embodiment of a continuous baling system 10 containing an embodiment of an accumulation frame. One having ordinary skill in the art should appreciate in the context of the present disclosure that the example continuous baling system 10 depicted in FIG. 1 is merely illustrative, and that other types of balers (e.g., not limited to round balers) and/or systems with different features (e.g., fewer or additional features) may be used in some embodiments. The continuous baling system 10 comprises a baler 12 (e.g., round baler) and an accumulation frame, where one embodiment is depicted in FIG. 1 and denoted with reference numeral 14. The accumulation frame 14 is substantially rectangular in configuration, and comprises plural opposing side walls 16 and 18. The accumulation frame 14 supports a rotatable conveyor 20, having a conveying surface 22 that enables the flow of crop material gathered on the conveying surface 22 to the baler 12. In one embodiment, the conveying surface 22 is embodied as one or more endless belts that rotate around rolls 24 and 26 on opposing ends of the conveyor 20, the rolls 24 and 26 enabling the rotatable coupling of the conveyor 20 to the accumulation frame 14. Note that reference herein to endless belts refers to conveying surfaces that move around fore and aft rotating members, such as the rolls 24 and 26, the conveying surfaces either integrally formed or connected (e.g., linear strips or bands that are laced or stitched or otherwise connected together or connected through an intermediate material) to provide a conveying surface that enables the movement around the rolls 24 and 26. The conveying surface 22 comprises a crop material-conveying width (e.g., the entire width, running transversely to the direction of movement of the conveying surface 22) that is defined by the opposing side walls 16 and 18 of the accumulation frame 14. In some embodiments, other types of conveying surfaces may be used, such as a chain and slat configuration, plural rollers, plural augers, among others. Note that the terminology, conveying surface 22, is intended to include a single surface as well as the collective surfaces, such as when the conveying surfaces are in the form of plural pieces (e.g., plural endless belts).

The continuous baling system 10 further comprises a well-known pickup mechanism 28 coupled to the forward portion of the accumulation frame 14, as well as a tongue 30 coupled to the front of the accumulation frame 14. The tongue 30 enables the continuous baling system 10 to be towed (e.g., across a field, etc.) by a towing vehicle (e.g., tractor, combine harvester, etc.) that is not shown. In some embodiments, other continuous baling system configurations may be used, including those that are self-propelled. The pickup mechanism 28 gathers crop material as the continuous baling system 10 is towed in the forward direction, the gathered crop deposited on the conveying surface 22. As the conveyor 20 rotates (e.g., as the conveying surface 22 rotate around the rolls 24 and 26), the deposited crop material is conveyed toward the baler 12. Note that in some embodiments, the pickup mechanism 28 may be located elsewhere (e.g., not coupled directly to the accumulation frame 14). For instance, the towing vehicle may be equipped with a pickup mechanism, and the gathered material may be discharged from the towing vehicle directly to the conveying surface 22 of the conveyor 20.

At a location proximal to the inlet of the baler 12 is a screed 32. The screed 32 comprises a frame 34 that is substantially rectangular in form. The frame 34 supports a rotatable conveyor 36. In one embodiment, the conveyor 36 comprises a conveying surface 38. In one embodiment, the conveying surface 38 may be embodied as a chain and slat arrangement, or in some embodiments, as one or more endless belts, rolls, augers, etc. The conveying surface 38 rotates (e.g., in either direction) around plural rotating members at opposing ends of the conveyor 36, such as a drive sprocket, idler sprocket, or driver and idler rolls, etc., the rotation powered by a motor located on the screed 32 or elsewhere. The screed 32 is pivotally coupled to the accumulation frame 14 by members 40, 42, 44, and 46, which are also coupled to the frame 34 of the screed 32. The screed 32 may be raised or lowered to the conveying surface 22 of the conveyor 20, or in some embodiments, to an intermediate rotating member (not shown) adjacent the conveying surface 22. Such adjustment may be achieved by one or more lifting mechanisms (e.g., hydraulic cylinder(s)) coupled to the frame 34 of the screed 32 and actuated by a power source (e.g., hydraulic pump) in the baler 12 or elsewhere. The screed 32 may be raised and lowered responsive to what stage or cycle in the baling cycle the baler 12 is currently operating, enabling the accumulation of the crop material on the conveyor 20 while the screed 32 is lowered (e.g., during the wrapping and ejecting stages) and permitting the accumulated (and incoming) crop material to flow into the baler 12 when the screed 32 is raised (e.g., during the bale formation stage). In some embodiments, the screed 32 may be omitted, and other mechanisms well-known in the art may be used to achieve the accumulation process.

The baler 12, as is well-known, forms the crop material conveyed to it by the conveyor 20 into a bale. The baler 12 comprises plural side walls 48 and 50, between which is a bale chamber 52 (e.g., sometimes also baling chamber or bale formation chamber), the bale chamber 52 having an inlet through which the crop material flows from the conveyor 20 and is formed into a round bale. As is well-known, the baler 12 may include bale forming mechanisms within the bale chamber 52, including a plurality of rolls (e.g., starting, lower, upper, belt tensioning, bale density, idler, etc.), bale forming belts, bale tensioning arms, bale density arms, base size sensors, among other components and/or sub-systems well-known to those having ordinary skill in the art. The baler 12 further comprises well-known componentry and/or sub-systems for bale wrapping and bale discharge operations. Further description of an example round baler 12 may be found in commonly-assigned United States patent publication number 20110023442.

The accumulation frame 14 comprises one of a plurality of different narrowing sub-systems to facilitate crop material flow in the transition between the conveying surface 22 of the conveyer 20 and the narrower bale chamber 52. For instance, in one embodiment, the accumulation frame 14 may be equipped with an active narrowing sub-system embodied as a stub auger 54A, as depicted in FIG. 1. The active narrowing sub-system comprises a pair of stub augers (e.g., only one of the stub augers 54A observable in FIG. 1) coupled to the opposing side walls 16 and 18 (the stub auger coupled to side wall 18 obscured from view). The rotation of the stub augers, such as stub auger 54A, of the active narrowing sub-system causes the flow of the crop material to move inward (e.g., toward the center of the conveyor 20). In some embodiments, another active narrowing sub-system, in addition to, or in lieu of, the pair of stub augers (e.g., 54A), may comprise a feeder rotor (not shown in FIG. 1) located at the inlet of the baler 12, the feeder rotor facilitating the movement of the crop material received from the conveyor 20 into the bale chamber 52. In one embodiment, the feeder rotor is configured with an auger that serves as a narrowing sub-system to enable the transition of crop material from the conveyor 20 to the bale chamber 52, as explained further below. In one embodiment, the bale chamber 52 comprises a width that is smaller (e.g., approximately two (2) feet smaller) than the width of the conveying surface 22 of the conveyor 20. Note that the use of approximately two (2) feet as the dimensional width difference between the conveying surface 22 and the bale chamber 52 is merely illustrative, and that other dimensional variations in width between the conveying surface 22 of the conveyor 20 and the bale chamber 52 are contemplated, such as a nine (9) foot width for the conveying surface 22 and an eight (8) foot wide bale chamber 52 (e.g., one (1) foot difference), or an eight (8) foot wide conveying surface 22 and a four (4) foot wide bale chamber 52 (e.g., four (4) foot difference), among other variations.

The conveyor 20 and the pickup mechanism 28 may be driven by their respective drive systems (e.g., independent), or via a common drive system, as is well-known in the art (partially shown in FIG. 1). For instance, in terms of plural independent drive systems, each drive system may include a hydraulic motor having a motor drive wheel. For example, the hydraulic motor for the pickup mechanism may be mounted on a motor mounting plate and arranged to rotate a pickup drive wheel, which in turn rotates a pickup drive roll. Similarly, a hydraulic motor for the conveyor may also be arranged to drive a conveyor drive wheel associated with the conveyor drive roll 26. For example, a drive belt or chain may be looped around the respective motor drive wheel and the pickup drive wheel or the conveyor drive wheel, as applicable, so that when the motor drive wheel is rotated, the pickup drive wheel (or the conveyor drive wheel) also rotates and in turn rotates the respective pickup roll or the conveyor drive roll 26 via the respective drive belt. As is well-known, fluid may be provided to the hydraulic motor(s) by a hydraulic pump located in the baler 12 (or elsewhere) via hoses to provide variable (or in some embodiments, fixed) fluid flow to control (e.g., vary) the speed of the motor and the operation of the pickup mechanism 28 and the conveying surface 22. The pump located in the baler 12 may also power (e.g., directly, or indirectly though an intermediate device or sub-system, such as a manifold of fluid controls) the stub auger 54A (and its pair) of the active narrowing sub-system (e.g., via a dedicated motor), and in some embodiments, an active narrowing sub-system embodied as the feeder rotor. In some embodiments, the feeder rotor may be driven mechanically (e.g., with a drive train). The pump may be powered by a power takeoff (PTO) mechanism of the towing vehicle, or in some embodiments, by power generated locally (e.g., power source residing in the baler 12). Further description of an example drive system and associated baler controls may be found in commonly-assigned United States patent publication number 20110023442.

The immediately aforementioned arrangement allows the movement of the conveying surface 22 to be controlled by a controller (not shown) located in the baler 12. The controller enables the conveyor 20 to be operated (e.g., rotated) in the crop material-conveying direction, and may also be used to control the screed 32 and any active narrowing sub-systems, as described below. For instance, the controller (e.g., responsive to operator intervention or automatically based on a sensed condition and/or machine parameter(s)) may deliver control signals to the conveyor motor(s) and/or other actuating devices or sub-systems (e.g., directly or via a hydraulic pump or manifold with hydraulic controls) to manipulate hydraulic fluid provided to the motor(s) and/or other devices via the hoses, and thus control the hydraulic motors and the movement of the conveying surfaces 22 and/or 38, the lifting mechanism of the screed 32, and/or any active narrowing sub-system, such as the stub auger 54A (and its pair) and/or feeder rotor, residing in the continuous baling system 10. The control signals may be communicated at different cycles or stages of the baling operations (e.g., responsive to completion of the bale forming cycle and before, or at a time corresponding to, the wrapping cycle). For instance, when the bale reaches full size in the bale chamber 52 (e.g., as detected by a baler sensor and communicated to the controller), the screed 32 may be lowered (and the implemented narrowing sub-system de-activated or made idle), closing the opening to the bale chamber 52 to avoid mixing the incoming crop material with the formed bale undergoing (or about to undergo) a wrapping or ejecting operation. When the bale in the bale chamber 52 has been wrapped and ejected, the screed 32 may be raised off of the conveying surface 22 (and any active narrowing sub-system activated, though in some embodiments, the active narrowing sub-systems may always be on when the baler 12 is in operation), providing a gap or opening (e.g., between the screed 32 and the conveyor 20) for the accumulated crop material to move into the bale chamber 52. Note that the change in fluid flow causes the aforementioned actuating devices or sub-systems to be dynamically controlled.

Figure 2:
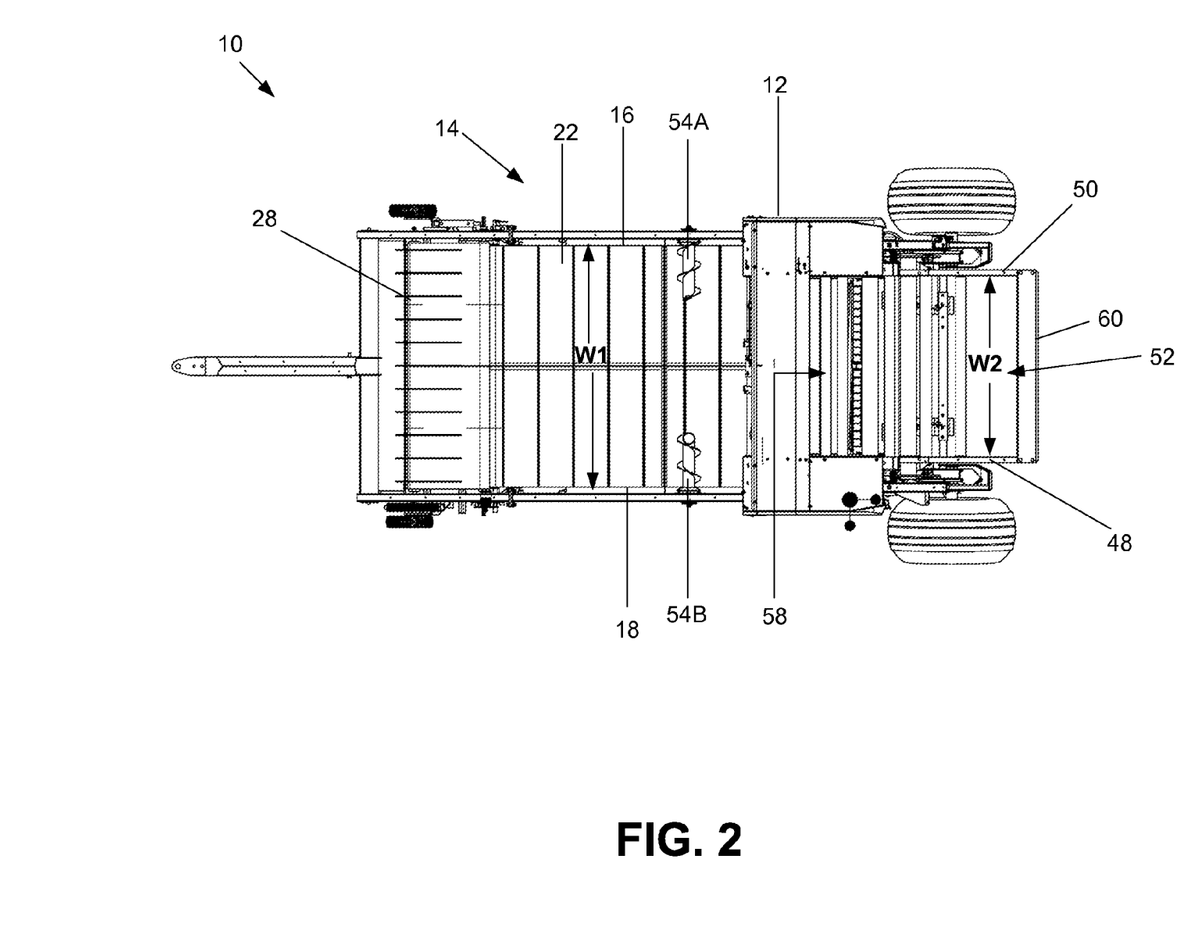
FIG. 2 is a schematic diagram that illustrates in top plan view an embodiment of a continuous baling system containing an embodiment of an accumulation frame.

Having described certain features of a continuous baling system 10, attention is directed to FIG. 2, which illustrates in top plan view the continuous baling system 10, and which focuses on select features. Note that the continuous baling system 10 in FIG. 2 is equipped with an active narrowing sub-system embodied as plural stub-augers 54A and 54B, with the understanding that the feeder rotor embodiment may also be present (though not shown) in some embodiments. In some embodiments, such as when the screed 32 (FIG. 1) is directly in front of the baler 12 (e.g., very small distance separating the screed 32 and the bale chamber 52), the feed rotor may be omitted. The continuous baling system 10 comprises the accumulation frame 14, which in one embodiment is coupled to the pickup mechanism 28 toward the front of the accumulation frame 14. The accumulation frame 14 comprises the opposing side walls 16 and 18, to which the stub augers 54A and 54B are coupled, and includes the conveying surface 22 located between the opposing side walls 16 and 18. In one embodiment, the width of the conveying surface 22 is defined between the opposing side walls 16 and 18 (e.g., internal surfaces facing the conveying surface 22) as a distance W1. One example dimension for distance W1 is approximately 2205 millimeters (mm). The accumulation frame 14 is coupled to the screed 32 (FIG. 1), which is located proximal to the baler 12. The baler 12 comprises opposing side walls 48 and 50, an inlet 58, and an outlet end 60, collectively defining the bale chamber 52. The bale chamber 52 comprises a width defined between the opposing side walls 48 and 50 as a distance W2. One example dimension for the distance W2 is approximately 1562 mm. In other words, the distance W1 is greater than the distance W2, and in this example, 643 mm or approximately two (2) feet greater. Stated otherwise, the side wall 16 may extend approximately one foot outside of one edge of the bale chamber 52, and the other side wall 18 may extend approximately one foot outside the other end of the bale chamber 52. It should be appreciated that these dimensions are merely illustrative, and that for bale chambers of the same or a different width, W2, W1 may likewise be different, as explained above.

The accumulation frame 14 comprises an area (e.g., the entire conveying surface 22) between the pickup mechanism 28 and the inlet 58 to the bale chamber 52 that may accumulate the crop material as the fully formed bale is wrapped and ejected from the bale chamber 52. The aforementioned accumulation area eliminates the need to stop forward travel of the continuous baling system 10 as the bale is being wrapped and ejected. A large volume or area may be needed to accumulate enough crop material in high yielding crops. By having W1 greater than W2, the accumulation area may be reduced in length and thus baler maneuverability is improved.

Concomitant with the reduction of width (from W1 to W2) is the fact that various narrowing mechanisms or sub-systems may be needed before the crop material enters the bale chamber 52 (e.g., to avoid unnecessary build-up, clogging, etc.). Certain embodiments of the continuous baling system 10 may include one or more types of narrowing sub-systems, such as the narrowing sub-system comprising at least the stub augers 54A and 54B shown in FIG. 2.

Figure 3:
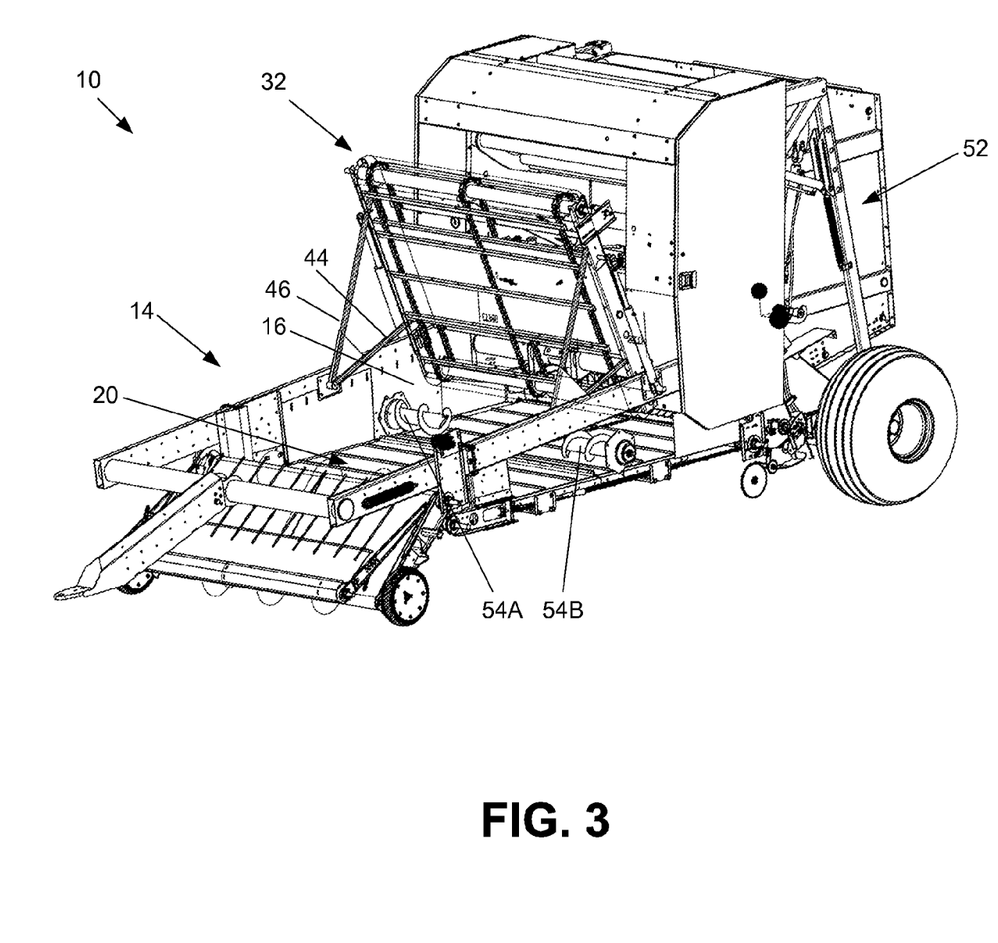
FIG. 3 is a schematic diagram in isometric view that illustrates an embodiment of a continuous baling system with one embodiment of an active narrowing sub-system.

Referring to FIG. 3, shown is a portion of the continuous baling system 10 in isometric view, illustrating one embodiment of the active narrowing sub-system embodied as stub augers 54A and 54B. The stub augers 54A and 54B are rotatably coupled to the side walls 16 and 18 (FIG. 1, side wall 18 removed in FIG. 3 to better show the stub auger 54B), respectively, of the accumulation frame 14. The stub augers 54A and 54B may be powered by a dedicated motor (not shown), such as a hydraulic motor powered by a hydraulic pump (directly, or indirectly via a manifold of control components) and controlled by a controller. In some embodiments, other motive forces (e.g., mechanical, electrical) and accompanying components may be used, and in some embodiments, the motors of other systems (e.g., conveyer 20, screed 32) may be used. The rotation of the stub augers 54A and 54B may cause the crop material to narrow before it enters the bale chamber 52. Note that the stub auger 54A (as is true for the other side 54B for side wall 18, though not shown) is depicted as contacting the side wall 16 proximal to where the members 44 and 46 of the screed 32 contact the accumulation frame 14. The stub augers 54A and 54B are also proximal to the inlet 58 (FIG. 2) of the bale chamber 52, though other locations are contemplated to be within the scope of the disclosure.

Figure 4:
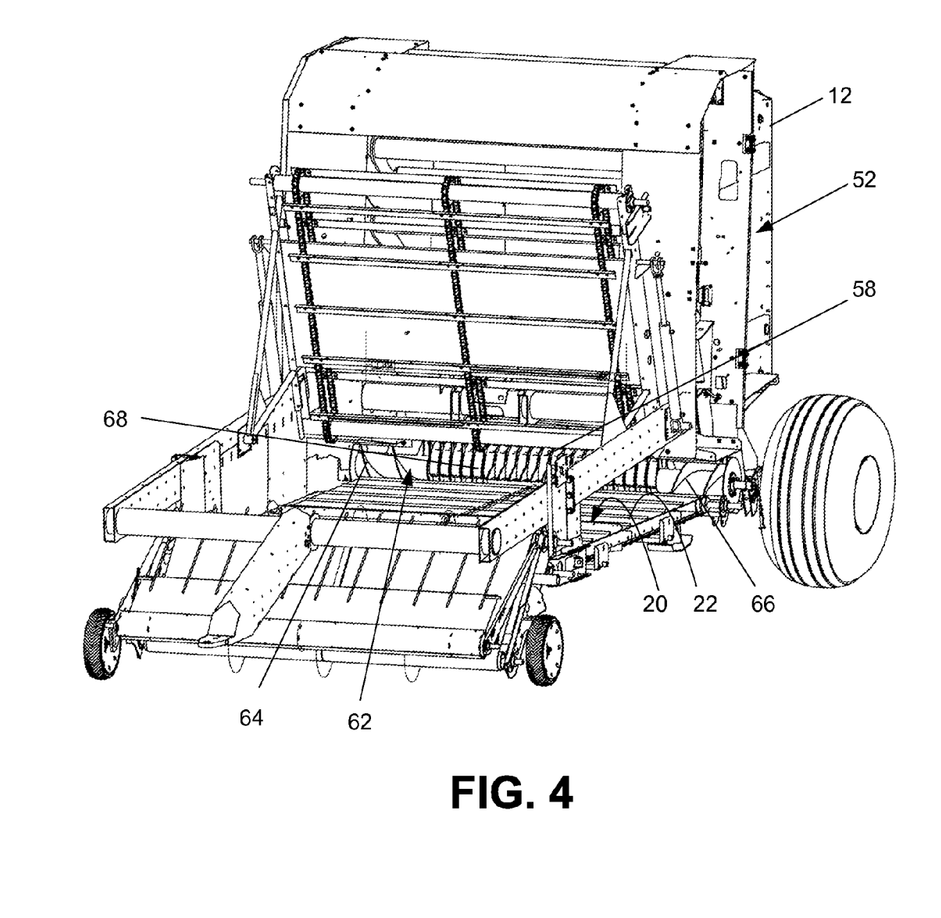
FIG. 4 is a schematic diagram in isometric view that illustrates an embodiment of an accumulation area with another embodiment of an active narrowing sub-system.

In another embodiment, such as depicted in FIG. 4, an active narrowing sub-system may be embodied as a feeder rotor 62 of the baler 12. The feeder rotor 62 runs transversely to the forward movement direction of the baler 12, and extends across the inlet 58 to the bale chamber 52. The feeder rotor 62 includes a single shaft having augers 64 and 66 on opposing sides of the shaft and plural finger-like elements 68 in between the augers 64 and 66. The fingers 68 facilitate the grabbing of the crop material from the conveying surface 22 of the conveyor 20 and into the bale chamber 52. The augers 64 and 66 influence the crop material received from the conveying surface 22 of the conveyor 20 inward to the reduced dimension, W2, of the bale chamber 52. In some embodiments, the entire feeder rotor 62 may be configured as an auger, or have more or fewer portions of the shaft configured with an auger. The feeder rotor 62 may be driven via a roller chain and sprocket drive along with the same system that turns the bale forming belts of the bale chamber 52. In some embodiments, the feeder rotor 62 may be driven by other mechanisms located in the baler 12. As noted above, the above-described active narrowing sub-systems (e.g., stub auger 54A and 54B and feeder rotor 62) may be combined in some embodiments of a single continuous baling system.

Figure 5:
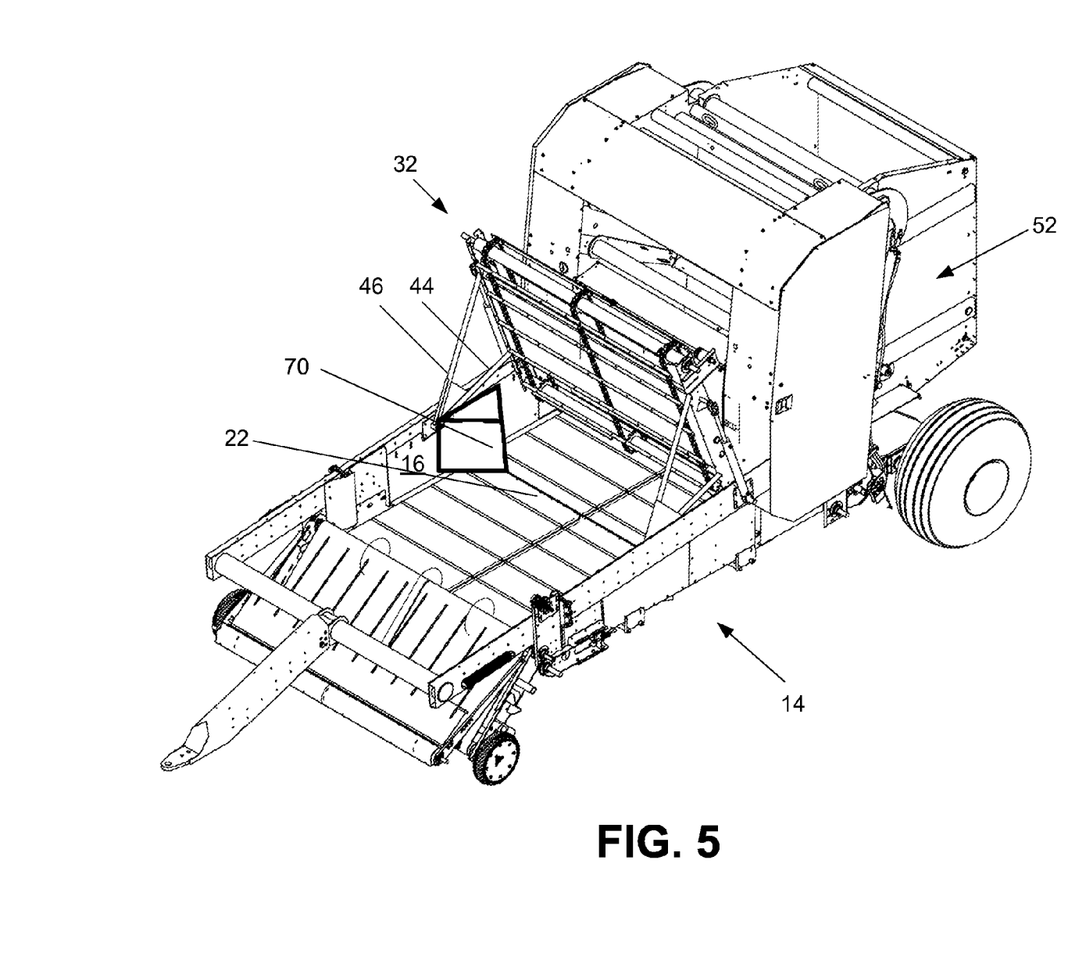
FIG. 5 is a schematic diagram in isometric view that illustrates an embodiment of an accumulation area with an embodiment of a passive narrowing sub-system.

FIG. 5 illustrates an accumulation area with an embodiment of a passive narrowing sub-system embodied as a pair of wedge structures, such as wedge structure 70 shown in FIG. 5 (the other half of the pair obscured from view, but with a mirrored configuration and hence description of the same is omitted here). The wedge structure 70 may be constructed of wood, metal, and/or plastic, etc. Although shows as a wedge, it should be appreciated within the context of the present disclosure that other angular geometries that passively enable the narrowing of crop material are contemplated to be within the scope of the disclosure. In some embodiments, the passive narrowing sub-system, such as the wedge 70, may be combined with an active narrowing sub-system, such as the rotor 62 (FIG. 4). The wedge structure 70 is angled toward the center of the conveying surface 22. The term, passive, refers to the fact that the wedge structure 70 is not directly agitated in any manner, but rather, remains stably in place while the crop material is routed along its angled edge toward the center of the conveying surface 22 to narrow the crop material. In one embodiment, the wedge 70 is affixed to the side wall 16 by any known affixing mechanism (e.g., screws, bolted, welded, etc.). The wedge 70 may lightly contact the conveying surface 22, or in some embodiments, there may be a small gap between the wedge 70 and the conveying surface 22. The wedge 70 is depicted as contacting the side wall 16 proximal to where the members 44 and 46 of the screed 32 contact the accumulation frame 14. The wedge 70 is also proximal to the inlet 58 (FIG. 2) of the bale chamber 52, though other locations are contemplated to be within the scope of the disclosure.

Figure 6:
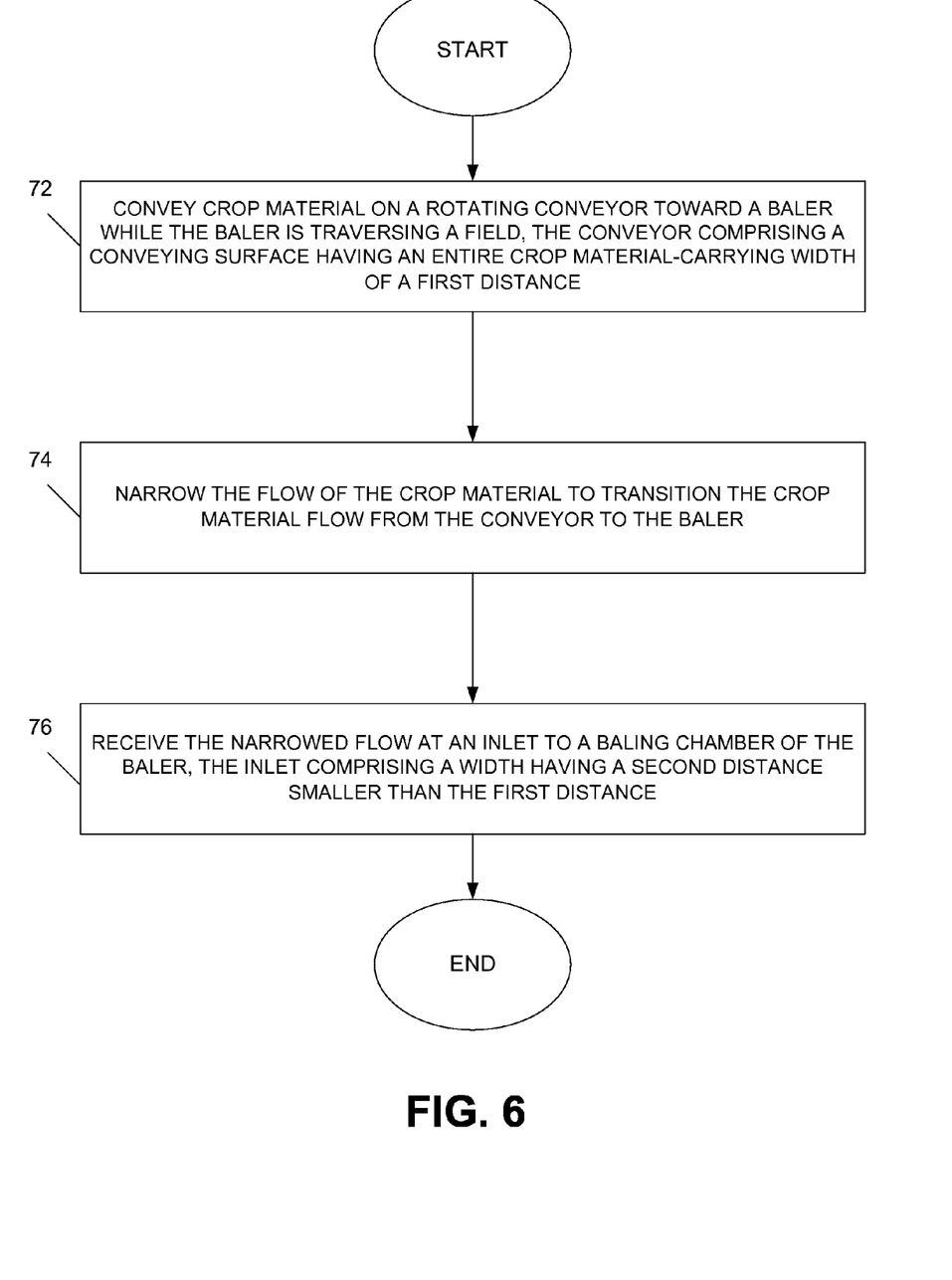
FIG. 6 is a flow diagram that illustrates an example embodiment of a continuous baling method.

In view of the above description, it should be appreciated that one embodiment of a continuous baling method, as depicted in FIG. 6 and denoted as method 72, comprises comprising conveying crop material on a rotating conveyor toward a baler while the baler is traversing a field, the conveyor comprising a conveying surface having an entire crop material-carrying width of a first distance (74); narrowing the flow of the crop material to transition the crop material flow from the conveyor to the baler (76); and receiving the narrowed flow at an inlet to a baling chamber of the baler, the inlet comprising a width having a second distance smaller than the first distance (78).

Note that steps in the process, and alternate implementations are included within the scope of the embodiments in which functions may be performed out of order from that shown or discussed, including substantially concurrently or in reverse order, depending on the functionality involved, and/or additional or fewer steps performed, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:
1. A continuous baling system, comprising:
   an accumulation frame comprising longitudinal first and second side walls;
   a pickup mechanism configured to pick up crop material as the continuous baling system traverses a field;
   a first conveyor rotatably coupled to the accumulation frame extending from a first end adjacent the pickup mechanism to a second end and disposed between the first and second side walls, the conveyor comprising a conveying surface moveable from front to back for conveying crop material deposited on the first conveyor by the pickup mechanism;
   a screed positioned adjacent the second end of the first conveyor comprising a rotatable second conveyor, the screed configured to be movable between a raised position and a lowered position relative to the first conveyor; and
   a baler coupled to, and adjacent to, the accumulation frame, the baler comprising a bale chamber for bale formation, the bale chamber comprising plural side walls,
   wherein when the screed is in the raised position, a gap is formed between the screed and the first conveyor so that crop material conveyed by the first conveyor passes through the gap between the screed and the first conveyor and into the bale chamber, and when the screed is in the lowered position, the screed closes the gap thereby obstructing the conveyed crop material to the baler so that crop material conveyed by the first conveyor remains on the first conveyor and does not enter the bale chamber while the baler is traversing a field; and wherein the accumulation frame comprises a first width defined by a first distance transverse to the direction of movement of the conveying surface and starting from the first side wall and ending at the second side wall, and wherein the bale chamber comprises a second width defined by a second distance between the plural side walls, the first distance greater than the second distance.

2. The continuous baling system of claim 1, further comprising an active narrowing sub-system disposed proximal to an inlet to the bale chamber and the conveying surface.

3. The continuous baling system of claim 2, wherein the active narrowing sub-system comprises one or more augers coupled to a shaft of a rotatable feeding rotor of the baler.

4. The continuous baling system of claim 2, wherein the active narrowing sub-system comprises plural stub augers rotatably coupled to the respective first and second side walls.

5. The continuous baling system of claim 4, wherein the plural stub augers are located proximal to a screed coupled to the accumulation frame.

6. The continuous baling system of claim 1, further comprising a passive narrowing sub-system disposed proximal to an inlet to the bale chamber and adjacent the conveying surface.

7. The continuous baling system of claim 6, wherein the passive narrowing sub-system comprises plural wedges coupled to the respective first and second side walls.

8. The continuous baling system of claim 7, wherein plural wedges are located proximal to a screed coupled to the accumulation frame.

9. The continuous baling system of claim 1, wherein the first distance is approximately two feet greater than the second distance.

\* \* \* \* \*